May 13, 1952      B. ESSICK      2,596,390
VEHICLE WHEEL MOUNTING
Filed June 14, 1948      2 SHEETS—SHEET 1
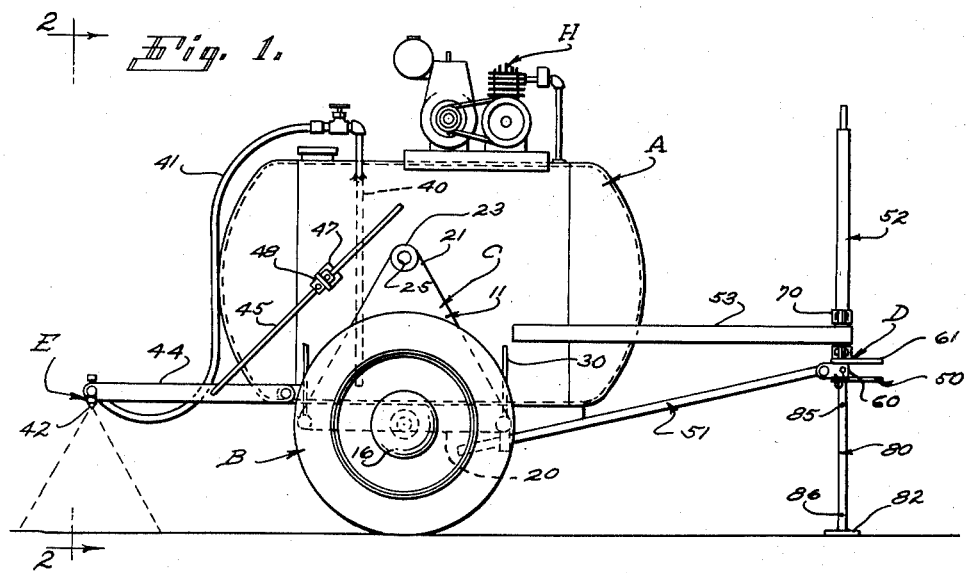
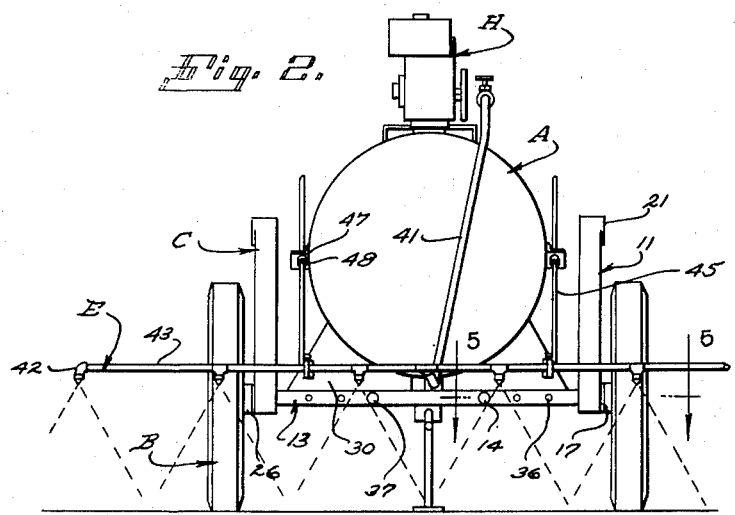
Inventor
Bryant Essick
By
Attorney May 13, 1952  B. ESSICK  2,596,390
VEHICLE WHEEL MOUNTING
Filed June 14, 1948  2 SHEETS—SHEET 2
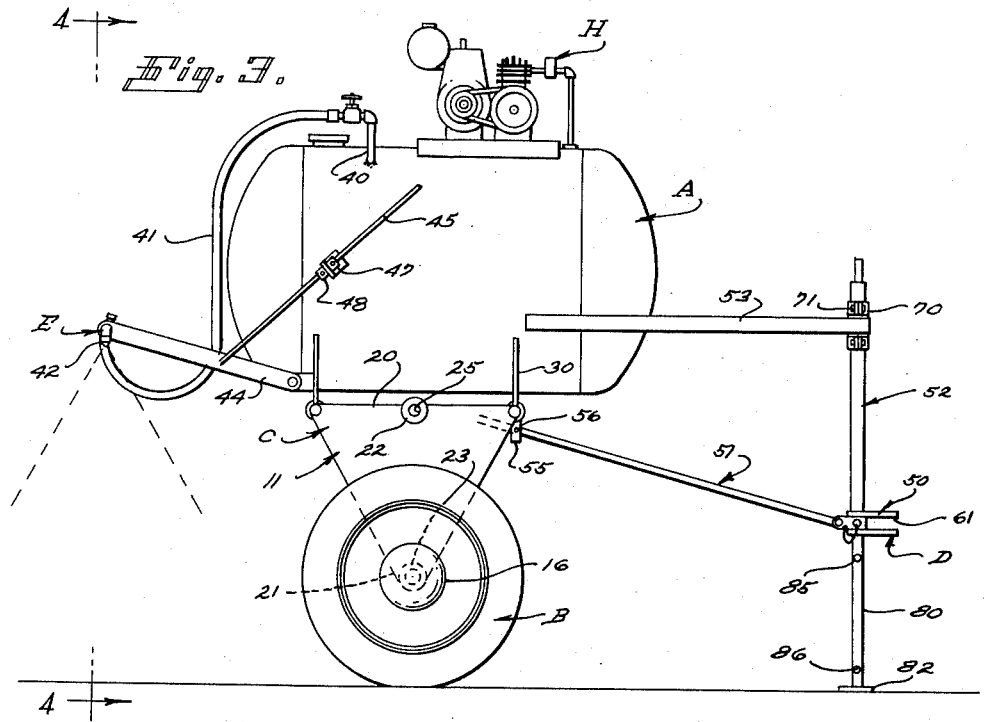
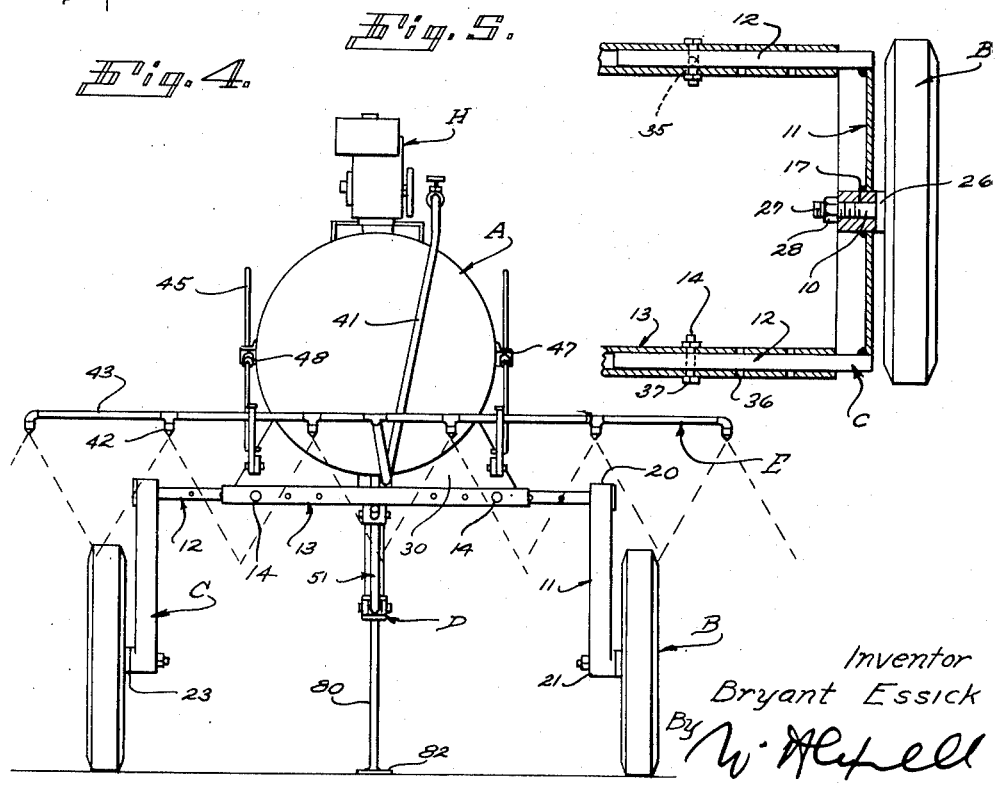
Inventor
Bryant Essick
By
Attorney Patented May 13, 1952

2,596,390

UNITED STATES PATENT OFFICE 2,596,390

VEHICLE WHEEL MOUNTING

Bryant Essick, Los Angeles, Calif., assignor to Essick Manufacturing Company, Los Angeles, Calif., a corporation of California Application June 14, 1948, Serial No. 32,790

4 Claims. (Cl. 280—43)

This invention is concerned with a vehicle wheel mounting and relates more particularly to a structure suitable for use on various vehicles, for example on vehicles to be used for the control of weeds or the spraying of crops of various kinds, etc. It is a general object of the present invention to provide a simple, sturdy, practical structure suitable for vehicles intended for use where vertical wheel adjustment is desired. Vehicles of this general type are often used in agricultural operations.

Vegetation, and particularly crops, or weeds, or combinations of crops and weeds are sprayed with various materials and at different stages of development. Some sprays are to control pests or blights while others are to selectively kill or control vegetation, as for instance, weeds that impair proper or full development of crops. Further, different crops vary in character and in the manner of planting or growth, it being common in the case of most crops to plant in rows and the spacing of the rows varies with the type or nature of the crop, and the growth of crops usually varies from that of weeds which are such as to require control or elimination. Further weeds are almost always a problem and are in most cases effectively controlled by spraying.

It is a general object of this invention to provide a vehicle wheel mounting for vehicles useful under a wide range of conditions and which is subject to being accommodated to various spacing of plant rows and to various heights of vegetation and other such conditions.

A further object of the present invention is to provide a structure of the general character referred to wherein the body of the vehicle is supported from wheels for adjustment to various positions vertically of the body so that the body operates at various distances above the ground.

A further object of the present invention is to provide apparatus of the general character referred to wherein the wheels that support the body are coupled to the body so that they can be adjusted laterally relative thereto in order to vary the spacing of the wheels to best accommodate rows of planting or the vegetation over which the structure operates or other like conditions.

A further object of the invention is to provide a structure of the general character referred to involving few simple, inexpensive parts which are effective and sturdy and which are easily operated to vary the position of the body above the ground and also the spacing of the wheels which support the body.

The various objects and features of my invention will be fully understood from the following detailed description of a typical preferred form and application of the invention, throughout which description reference is made to the accompanying drawings, in which:

Fig. 1 is a side elevation of a typical embodiment of the present invention showing it adjusted so that the body is close to the ground and showing it in a state of rest and indicating the manner in which a spray may be delivered to vegetation at or immediately adjacent the ground. Fig. 2 is an end view of the structure shown in Fig. 1, being a view taken as indicated by line 2—2 on Fig. 1. Fig. 3 is a view similar to Fig. 1 showing the body of the apparatus supported a substantial distance above the ground and showing the structure supported in an upright position and indicating the manner in which a spray may be delivered to vegetation well above the ground. Fig. 4 is an end view of the structure taken as indicated by line 4—4 on Fig. 3, and Fig. 5 is an enlarged plan sectional view taken as indicated by line 5—5 on Fig. 2.

The structure embodying the present invention involves, generally, a body A, supporting wheels B, mounting means C by which the body is supported on the wheels, draft means D and spraying means E.

The body A may, in practice, vary widely in form and construction. The body is shown in the nature or form of a tank or liquid-carrying vessel which is a rigid sturdy construction, making it unnecessary to provide a supporting frame for the body. In the form of the invention illustrated the body is an elongate, horizontally disposed tank closed at its ends and the body is directly coupled to the supporting wheels B through the means C so that there is no intervening frame structure such as is common to vehicles, generally.

In the preferred form of the invention there are but two wheels arranged to form a pair of supporting wheels for the body A and through the means C the wheels B are mounted at the sides of the body A, preferably on an axis located somewhat rearward of the center of gravity of the body A so there is normally a tendency for the body to tip forward rather than rearward.

The mounting means C provided by the present invention involves, generally, wheel spindles 10, brackets 11 carrying the spindles 10, arms 12 carried by and projecting from the brackets 11, holders 13 for the arms 12 and carried by the body A, and suitable fasteners 14 connecting the arms and holders so that the arms are held against shifting relative to the holders.

The wheel spindles 10 are received in the hubs 16 of the wheels B and they have shank portions 17 projecting from the inner sides of the wheels.

There is a bracket 11 provided to carry each wheel spindle 10 and in accordance with the present invention the brackets are arranged at the inner sides of the wheels. In the form of the invention illustrated each bracket is a vertically disposed plate-like element. The particular bracket illustrated in the drawings is elongate and vertically disposed and is triangular in shape, having a base portion 20 at one end and an apex portion 21 at the other end.

In accordance with the present invention each bracket 11 carries a wheel spindle 10 so that it projects from the outer side of the bracket and the structure is such that the spindle can be located at different points vertically of the bracket. In the case illustrated the bracket is provided with two vertically spaced spindle receiving bosses 22 and 23. The bosses are located at the end portions of the bracket, the boss 23 being located at the apex portion 21 of the bracket while the boss 22 is located at the base portion 20 of the bracket, preferably in vertical alignment with the boss 23. Each spindle carrying or receiving boss has a horizontally disposed spindle receiving opening 25 for receiving the spindle shank 17.

In the form of construction illustrated each spindle has a shoulder or flange 26 at the outer end of the shank portion 17 and has a threaded part 27 at the inner end of the shank. A nut 28 or other retaining device may be applied to the inner end part 27 to secure the spindle to the bracket as shown in Fig. 9 of the drawings.

In the form of the invention illustrated there are two arms 12 projecting from the inner side of each bracket 11. The two arms of each bracket are shown joined to the base portion 20 of the bracket, preferably at the ends thereof, so that they are spaced a substantial distance apart horizontally and lengthwise of the structure, as shown throughout the drawings. The arms 12 are preferably rigid bars, or like elements, permanently joined to the plate forming the brackets and they are preferably of substantial length as shown in the drawings.

The holders 13 which carry the arms 12 are suitably fixed or secured to the body A, as by webs 30, or the like, so that they extend transversely of the body immediately beneath the body and so that they are spaced apart longitudinally of the structure in the same manner that the arms 12 are spaced apart. In the form of the invention illustrated the holders 13 are straight tubular parts of equal length and open at their ends to receive the arms 12 projecting from the brackets 11.

From the foregoing description and from the drawings it will be apparent that the arms 12 of the two brackets 11 may be extended or engaged in the holders 13 so that the brackets 11 are close to or immediately adjacent the ends of the holders, in which case the wheels B are in an in or fully collapsed position where there is a minimum distance between them or the arms may be engaged with the holders so that only limited portions of the arms are engaged in the holders, in which case the arms project a substantial distance beyond the ends of the holders and support the brackets in an extended or spread condition where the wheels are far apart. With the construction provided by the invention either one or both of the brackets can be adjusted as circumstances require, although ordinarily it is preferred that both brackets be adjusted uniformly so that the two wheels are supported equal distances from the two sides of the body.

The fastening devices 14 provided for securing the arms against movement relative to the holders 13 may, in practice, be any suitable means releasable holding the arms against longitudinal movement in the holders. In the case illustrated each arm is provided with a transverse opening 35 and each holder has longitudinally spaced openings 36 and when the opening 35 in an arm is positioned in register with an opening 36 in a holder a screw fastener or bolt 37 may be engaged through the registering openings to effectively hold the arm against shifting. This particular form of fastener is not only simple but easily operated and is secure when properly engaged.

By locating the holders 13 in a horizontal plane as shown in the drawings, and by locating one spindle-receiving boss of the bracket at the base portion of the bracket while the other boss is at the apex portion of the bracket, the bracket can be positioned as shown in Fig. 1 with the wheel spindle in the boss that is at the base portion of the bracket, with the result that the body A is supported low or close to the ground, or the bracket may be positioned as shown in Fig. 3 with the wheel spindle in the boss at the apex of the bracket, with the result that the body A is supported in an elevated position or well above the ground. The structure that I have provided is such that the bracket can be readily reversed by merely disengaging the fastening devices 14 and the wheel-carrying spindle can be changed from one bracket boss to the other through suitable operation of the retaining nut that holds the spindle in operation.

The spray means E illustrated is for handling material delivered by or from the body A. In the particular case illustrated the body carries a compressor unit H which maintains superatmospheric pressure on liquid in the body A and liquid is delivered from the body through a siphon tube 40 and a flexible connection 41 to be finally discharged from nozzles 42 carried by a horizontally disposed transverse boom 43. The boom is shown carried by pivoted arms 44 normally held by supporting rods 45.

The structure just described is such that it can be adjusted so that the arms 44 support the boom 43 in the desired vertical position at the rear end of the body A. In Fig. 1 the arms 44 are shown horizontally disposed whereas in Fig. 3 they are shown in a somewhat elevated position. The arms 45 are slidably carried by brackets 47 on the sides of the body A and adjustable stop collars 48 on the rods 45 engage or cooperate with the brackets 47 in setting the rods in position to hold the arms at the desired angle. Through the construction just described the nozzle carrying boom is readily adjustable to various positions above the ground providing for accurate positioning of the nozzles when the body A is in either the position shown in Fig. 1 or that shown in Fig. 3. Through the combined adjustment gained through the means C and that gained through the adjustability of the nozzle carrying boom a very wide range of nozzle adjustment may be gained.

The draft means D is shown as including a draft yoke 50, a tongue 51 coupling the yoke to the body A, a stem 52 projecting upwardly from the yoke and a brace 53 connecting the stem and the body A. The yoke 50 provided for making a typical connection with a draft vehicle or the like is shown as including a block 60 and vertically spaced jaws 61 fixed to and projecting forward from the block. The jaws are provided with registering or vertically aligned openings for the reception of a coupling pin. The tongue 51 is shown pivotally connected to the block 60 and is pivotally connected to a lug 55 depending from the body A by a pin 56.

A stem projects vertically from the yoke 50 and is slidably engaged in the brace 53. Stop collars 70 are slidably engaged on the stem and are provided with clamp screws 71 so that they can be set on the stem above and below the brace 53 to locate the stem in any desired position vertically. In practice it is common to locate the stem 51 either in an up position such as is shown in Fig. 1 so that the yoke 50 is carried immediately adjacent the forward end of the brace 53, or in a down position such as is shown in Fig. 3 where the yoke is supported a substantial distance below the forward end of the brace. Through the construction just described the apparatus can be effectively coupled to a draft vehicle having a draw bar, or other like device, located at a given distance above the ground.

In addition to the elements above described the structure may include a supporting leg 80 carried by the draft means D to brace the structure when it is not being operated over the ground or is not attached to the draft vehicle or the like. In the form of the structure illustrated the supporting leg 80 involves a vertically disposed part passing upwardly through the block 60 and slidably received in the stem. A foot 82 on the lower end of the leg engages the ground and a pin is adapted to be engaged through the block and through an opening in the leg to set the leg in a definite position relative to the yoke and stem.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A mounting for a vehicle wheel including, a wheel carrying spindle, a vertically disposed substantially triangular bracket, spaced parallel holders secured to the vehicle and extending transversely thereof in a substantially horizontal plane, and arms projecting from the base of the bracket and engaged with the holders, the bracket having vertically spaced spindle receiving parts to selectively receive and hold the spindle, one of said parts being at the base of the bracket and another being at the apex of the bracket.

2. A mounting for a vehicle wheel including, a wheel carrying spindle, a vertically disposed substantially triangular bracket, spaced parallel tubular holders secured to the vehicle and extending transversely thereof in a substantially horizontal plane, and arms projecting from the base of the bracket and engaged with the holders, the bracket having vertically spaced spindle receiving parts to selectively receive and hold the spindle, one of said parts being at the base of the bracket and another being at the apex of the bracket, the relationship between the arms and holders being reversible to reverse the direction in which the bracket extends vertically from the arms.

3. A mounting for a vehicle wheel including, a wheel carrying spindle, spaced parallel holders secured to the vehicle and extending transversely thereof in a substantially horizontal plane, and a rigid unit including a vertically disposed plate with vertically spaced openings therethrough adapted to selectively receive and hold the spindle with the wheel carrying portion of the spindle projecting from one side of the plate, and spaced parallel arms projecting horizontally from the plate at the opposite side thereof, each arm being adapted to be received and held by either holder and the arms being simultaneously engageable with the holders whereby the unit is supported by the holders with the bracket projecting in a selected direction vertically from the arms.

4. A mounting for a vehicle wheel including, a wheel carrying spindle, a vertically disposed substantially triangular bracket, spaced parallel tubular holders secured to the vehicle and extending transversely thereof in a substantially horizontal plane, arms projecting from the base of the bracket and slidably engaged with the holders, the bracket having vertically spaced spindle receiving parts to selectively receive and hold the spindle, one of said parts being at the base of the bracket and another being at the apex of the bracket, the relationship between the arms and holders being reversible to reverse the direction in which the bracket extends vertically from the arms, and means adjustably holding the arms against movement lengthwise of the holders including screw fasteners engaged through registering holes in the holders and arms, the holes being disposed diametrically of the holders.

BRYANT ESSICK.

REFERENCES CITED

The following references are of record in the file of this patent:

UNITED STATES PATENTS

| Number | Name | Date |
| --- | --- | --- |
| 107,710 | Osgood | Sept. 27, 1870 |
| 1,710,122 | Sorenson | Apr. 23, 1929 |
| 2,025,257 | Vaughn et al. | Dec. 24, 1935 |
| 2,248,080 | Hathaway | July 8, 1941 |
| 2,275,302 | Magnuson | Mar. 3, 1942 |
| 2,499,052 | Brookins | Feb. 28, 1950 |